United States Patent [19]

Crain

[11] Patent Number: 5,106,136

[45] Date of Patent: Apr. 21, 1992

[54] MOTORCYCLE BUMPER SYSTEM

[76] Inventor: William E. Crain, 544 Elk Spur St., Elkin, N.C. 28621

[21] Appl. No.: 729,437

[22] Filed: Jul. 12, 1991

[51] Int. Cl.$^5$ .............................................. B60J 27/00
[52] U.S. Cl. .................................. 293/105; 280/304.3
[58] Field of Search .................... 293/105; 280/304.3, 280/304.4, 290, 291; 180/219

[56] References Cited

U.S. PATENT DOCUMENTS

| Re. 33,178 | 3/1990 | Ahlberg | 280/304.3 |
|---|---|---|---|
| 1,941,801 | 1/1934 | Harley | 293/105 |
| 3,902,740 | 9/1975 | Lucier et al. | 280/304.3 |
| 4,311,335 | 1/1982 | Winieki | 293/105 |

FOREIGN PATENT DOCUMENTS

634838  3/1950  United Kingdom ............... 293/105

Primary Examiner—Robert R. Song
Attorney, Agent, or Firm—Robert S. Stoll; Samuel J. Stoll

[57] ABSTRACT

A motorcycle bumper system having at least two non-confining bumpers, one on each side of a motorcycle, the bumpers being located adjacent the normal riding position of the rider's legs, and being matched to the vertical dimension and height from the ground of conventional automobile bumpers to provide primary protection against a sideward impact in an automobile-motorcycle collision, the motorcycle bumpers being secured to the motorcycle frame by straight-line bumper supports oriented to point substantially squarely at the colliding automobile bumper and enabling the motorcycle bumpers to meet the impact of the automobile bumper head-on, further protection being provided by a cam-faced rigid bumper configuration adapted to cam the colliding automobile and motorcycle bumpers apart, and an energy-absorbing covering on said bumper.

18 Claims, 8 Drawing Sheets

MOTORCYCLE BUMPER SYSTEM

BACKGROUND OF THE INVENTION

1. Field of the Invention

Bumper systems for motorcycles providing protection in collisions with other vehicles.

2. Prior Art

The following United States patents comprise the closest prior art known to applicant:

| | |
|---|---|
| Hall | Registration No. 1,941,799 |
| Hamilton | Registration No. 1,941,800 |
| Harley | Registration No. 1,941,801 |
| Howell | Registration No. 1,941,802 |
| Turner | Registration No. 3,486,765 |
| Persons | Registration No. 3,486,766 |
| Lujan | Registration No. 3,486,767 |
| Masser | Registration No. 3,486,768 |
| Sklodowsky | Registration No. 4,111,448 |
| Vertucci | Registration No. 4,136,890 |
| Bothwell | Registration No. 4,411,333 |
| Winiecki | Registration No. 4,416,465 |
| Bothwell | Registration No. 4,650,204 |
| Ahlberg | Registration No. 4,673,190 |
| Hara | Registration No. 4,685,530 |
| Kopich | Registration No. 4,685,531 |
| Gunness | Registration No. 4,685,532 |
| Piesik | Registration No. 4,685,533 |
| Kadono et al. | Registration No. 4,691,800 |

A primary form of protective structure for motorcycles as disclosed in the prior art patents is the tubular steel crashbar that is bolted to the frame of the motorcycle and covers various portions of the motorcycle and the rider's legs.

However, numerous studies by the Japanese Automobile Research Institute (JARI) and the National Highway Traffic Safety Administration (NHTSA) and others, have found that these types of crash or protective bars do not have sufficient strength to prevent the intrusion of an automobile bumper during a crash, and are ineffective in reducing leg injuries. These studies have also found that this type of design often increases the risk of serious injury to the rider above and beyond what he would face if his motorcycle had no crash bars at all. Vertical tubing creates the risk of hooking of tubing by a car bumper, causing the motorcycle (and its occupants) to be violently rotated and accelerated. Horizontal tubing that crosses over the leg of the rider and vertical tubing (which can be sideswiped by an automobile bumper and bent by the force of impact so that it wraps around or over the rider's leg) create the risks of both direct, traumatic injury to the leg from being struck or crushed by the crashbar, and the pinning of the rider's leg (and, consequently, the rider himself) to the motorcycle, thereby increasing the danger of injury to the rider as the motorcycle falls, approaches a fixed object, goes over a cliff or embankment, or catches fire. The risk of head and other very serious injuries to the rider is increased when a tubular, rigid crashbar is used (the stronger the crashbar, the greater this risk becomes) since the force-absorbing characteristics of the rider's leg are replaced by the non-absorbent crashbar. Moreover, traditional attempts to achieve sufficient strength with the tubular design inevitably require large quantities of tubing that is wide, thick and heavy, which in turn reduces the maneuverability of the motorcycle, (perhaps the greatest inherent safety feature of the motorcycle), and by making the motorcycle look ugly and cumbersome, reduces consumer acceptance and willingness to pay extra for a safer design. Tubular crash bars of any shape, that can be bent or broken during impact, reduce safety by increasing the difficulty of dismounting the motorcycle and creating the risk of punctures, lacerations and similar injuries.

The motorcycle bumper system herein disclosed and claimed eliminates these problems. There are no tubes subject to being bent and no bolt subject to slippage or failure. The non-collapsible, force resistant component of the motorcycle bumper system is composed of either (a) the bumper inner core 30a (52,66)/support bar 30c (62,92) combination or support bar 119. Since the upper and lower bars of both configurations are horizontally disposed to the ground at approximately the upper and lower levels of a standard automobile bumper, the motorcycle bumper system can only fail if (a) the attachment brackets 42 (72,106) fail or (b) the support bars 30c (62,92) compress, since the brackets have been designed to eliminate horizontal slippage and withstand a protectable impact force.

SUMMARY OF THE INVENTION

This invention comprises a motorcycle bumper system having at least two bumpers, one on each side of the motorcycle, each bumper being supported by direct longitudinal attachment to the motorcycle frame, and located adjacent to the normal riding position of the rider's legs, with both the bumpers and the longitudinal supporting attachment being matched to the vertical dimension and height from the ground of conventional automobile bumpers. The bumper would be constructed with a cam-faced, energy-absorbing exterior and non-collapsible, impact resistant interior.

By longitudinally concentrating the strength and mass of this motorcycle bumper system in one precise, strategic location, it is possible to provide a leg protection device which decreases the risk of direct-trauma leg injury, hooking, and increasing acceleration of the rider upon impact, while being, as compared to tube-type crash bars, relatively (a) small and non-confining, thereby reducing the risk of the bumper area entrapping or crushing the motorcycle rider's leg in a collision or emergency dismounting, (b) resistant to the longitudinal forces exerted by an automobile bumper during a collision, and yet sufficiently lightweight to preserve the inherent accident avoiding maneuverability of the motorcycle, (c) consistent with normal appearance of the motorcycle, (d) practical for attachment as both original and accessory equipment and (e) low in unit cost.

An important feature of the bumpers of the present invention is the cam-faced configuration of their collision impact section. This configuration, tends to cam the automobile and motorcycle bumpers apart.

Moreover, each bumper has a composite construction consisting of a relatively non-collapsible inner structure adapted to be securely supported by as the motorcycle frame or engine block, and an energy-absorbing, impact cushioning section mounted on the inner structure. By concentrating the mass of the leg protecting motorcycle bumper in one precise, strategic location, the motorcycle continues to look and perform like a motorcycle and a very favorable strength-protection/weight ratio is achieved, while the dangers associated with tubular-type crashbars (compromise of freedom to dismount, risk of hooking, loss of shock absorbency and loss of maneuverability) and leg covering devices (compromise of freedom to dismount, absence of direct impact safety zone) are substantially reduced or eliminated.

DETAILED DESCRIPTION OF PREFERRED EMBODIMENTS OF THE INVENTION

Figure 1:
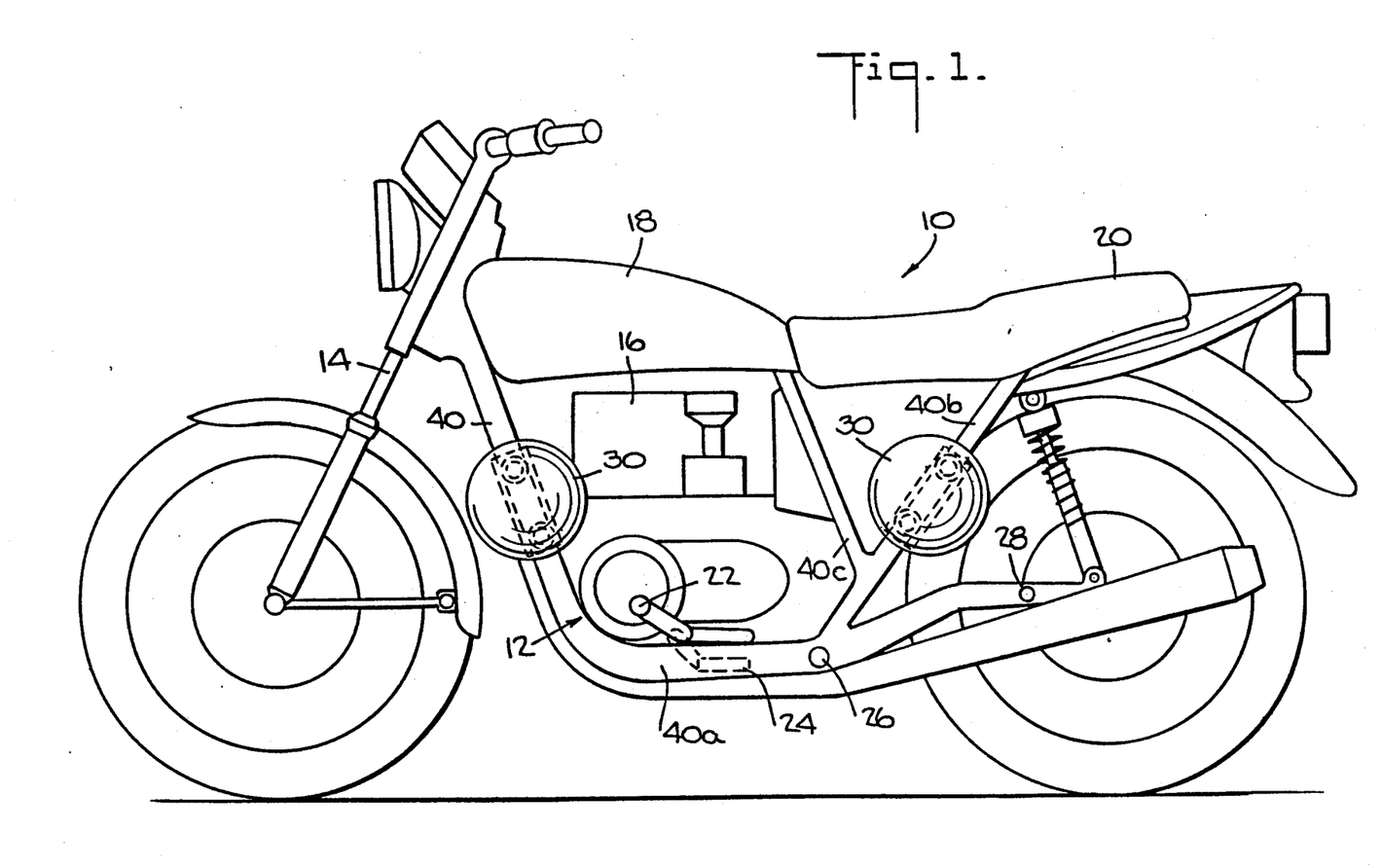
FIG. 1 is a side view of a motorcycle embodying a bumper system in accordance with one form of the invention.

Motorcycle 10 shown in FIG. 1 of the drawing is intended to represent conventional motorcycles of both domestic and foreign design. It includes a conventional frame 12, a conventional fork 14, a conventional motorcycle engine 16 mounted to said frame, a conventional fuel tank 18, a conventional seat 20 that may accommodate a passenger as well as the rider (driver) of the motorcycle, a gear shift pedal 22 on one side of the motorcycle frame, a brake pedal 24 on the opposite side of the motorcycle frame, and a rider foot rest 26 and passenger foot rest 28 on each side of the motorcycle frame.

In one preferred form of the invention (FIGS. 1–9) there is at least one bumper 30, as herein claimed, on each side of the motorcycle frame. Preferably, however, there are two such bumpers on each side, one adjacent the gear shift or brake pedal, the other adjacent the passenger foot rest. As shown in FIG. 1, the bumper adjacent the gear shift or brake pedal is located forward of the normal riding position of the rider's (driver's) leg. Similarly, the bumper adjacent the passenger foot rest is located forward of the normal riding position of the passenger's leg. However, if desired, the latter bumper may be located behind the passenger foot rest and behind the normal riding position of the passenger's leg. In such case, the rider's and passenger's legs would be located between the two bumpers.

Figure 2:
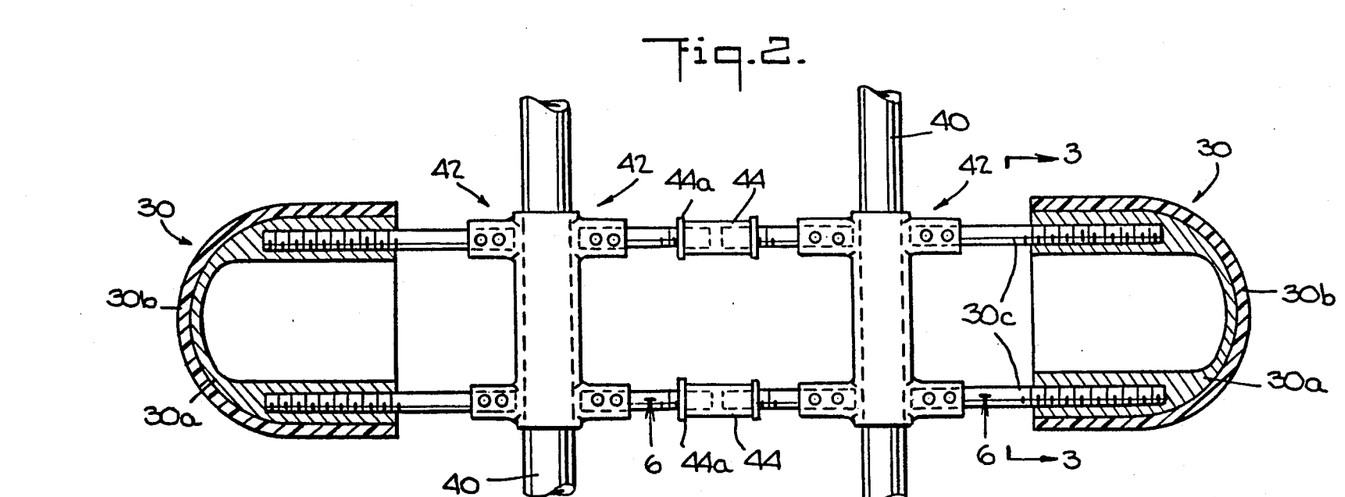
FIG. 2 is a fragmentary view, partly in vertical section, showing the bumper system mounted on the front frame members of the motorcycle.
Figure 3:
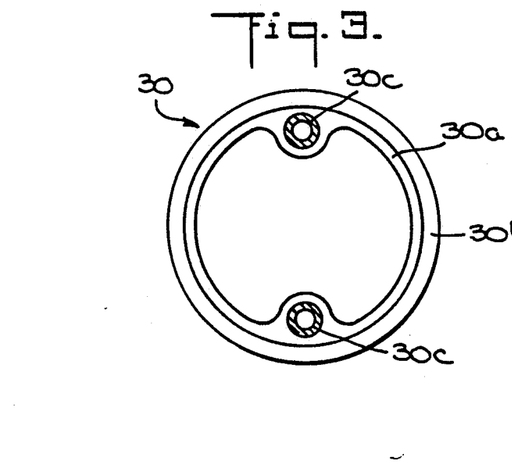
FIG. 3 is a vertical section on the line 3—3 of FIG. 2, showing the back of one of the bumpers.
Figures 4, 5:
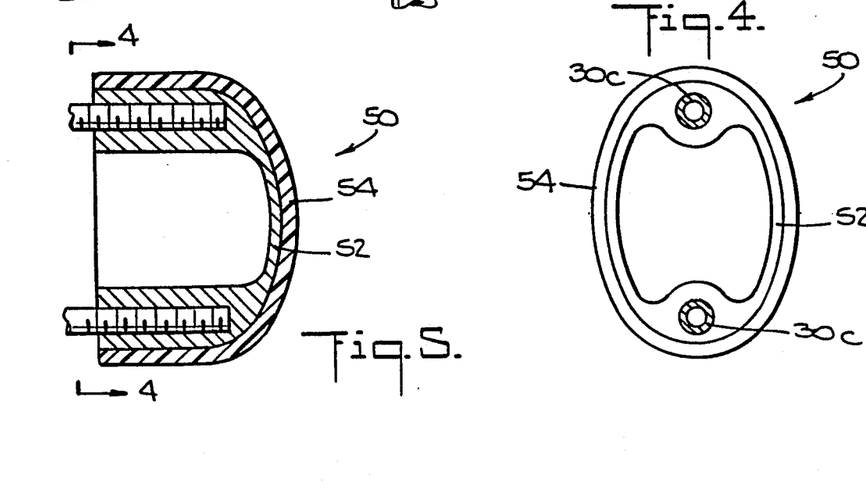
FIG. 4 is a view similar to that of FIG. 3 showing the back of a second form of bumper, this view being taken on the line 4—4 of FIG. 5.
FIG. 5 is a fragmentary view, in vertical section, of said second form of bumper.
Figure 6:
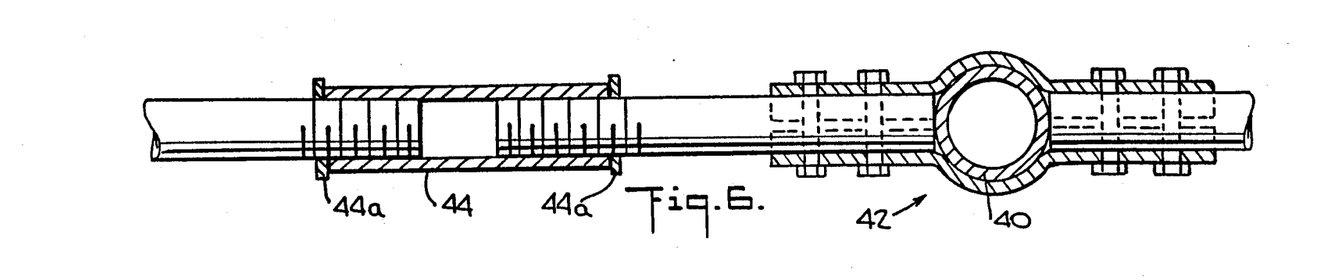
FIG. 6 is a fragmentary, enlarged horizontal section showing the bumper support means of FIG. 2.

It will be observed from FIGS. 2 and 3 that each bumper 30 comprises an inner core 30a, an outer covering 30b on said core, and support bars 30c for mounting the bumper to the motorcycle frame or engine block, as preferred. In its simplest form, bumper core 30a has a cam-faced configuration, e.g., that of a spherical segment. It is the primary design consideration of inner core 30a that it be constructed of materials that have sufficient strength and mass to withstand, to the maximum feasible extent, the forces generated in automobile-motorcycle accidents involving protectable impact forces. ("Protectable Impact" means a range of impact forces within which a rider's leg can be saved and that are not so great that the motorcycle will be so severely damaged and the rider so severely injured that a design intended to save the rider's leg would be meaningless.) Many studies have been conducted by JARI, NHTSA and others to determine up to what impact forces protecting the rider's legs on motorcycles of different weights would be meaningful, bearing in mind the weight of the protection device (inversely related to maneuverability) and cost. Thus the material and mass of inner core 30a and support bar 30c will be different for different motorcycles. Inner core 30a may be made of steel, aluminum, fiberglass, chromium-molybdenum, carbon fiber, titanium or other equally strong material. For example, a heavy touring motorcycle can be fitted with a solid steel bumper at a reasonable cost (relative to the cost of the motorcycle) and with little or no loss of maneuverability. On a small "off-road" motorcycle, the bumper 30a could be constructed with a hollow core and lighter weight materials. Alloys are available that are strong, light and relatively expensive; on a high-end motorcycle, this could be a good choice. For each motorcycle, however, the design goal would be identical: optimum safety at a reasonable cost. For each motorcycle, the least expensive bumper that would provide the greatest leg protection without unduly sacrificing maneuverability would be chosen. The covering 30b may comprise a resilient material such as latex, synthetic rubber, polyurethane, polyethylene or other resilient, but still collapsible material. The longitudinal (axial) depth of the outer shell 30b will be determined for each motorcycle, and will vary with the turning characteristics of each, with the depth being equal to that depth that will be the greatest without creating an undue risk of injury due to contact with the ground during a turn or due to a loss of turning maneuverability. The depth of the outer shell adjacent to the rider's leg will be sufficient to reduce or eliminate significant leg injury during a protectable impact if the leg contacts the bumper 30.

Tubes made of steel, aluminum, steel alloy, chromium-molybdenum, carbon fiber, titanium or equally strong material may function as supports bar 30c to support the bumper on the frame of the motorcycle. The primary design characteristic of support bar 30c is to be able to withstand, to the maximum feasible extent, protectable impact forces without deforming, particularly in sideswipe collisions, where there is a risk of the bumper 30 being driven back against the rider's leg. Since these bars are of relatively short length, they can be constructed of materials as strong as downtubes 12 (the connection of the downtubes by bar 30a increases their relative strength) without compromising maneuverability by adding excessive weight. The ends of each support bar 30c must also be solid or of sufficient gauge and strength to allow for threading that will not fail to the maximum feasible extent, during a protectable impact. These support bars may be secured to the bumper by any suitable means, e.g., by being screwed into threaded receptacles 30d in the bumper. This connection also provides means for adjusting the lateral position of the bumper relative to the motorcycle. By threading 30c into inner core 30a of bumper 30 (with the length of tube 30c always remaining inside inner core 30a sufficient to withstand to the maximum feasible extent a protectable impact determined for each motorcycle), the depth and mass of inner core 30a adds both adjustability and strength to withstand a protectable impact. As is shown in FIG. 1, the motorcycle frame 12 includes two generally upright frame sections or downtubes 40 at the front end. On each side of the motorcycle, bumper support bars 30c pass in front of and are secured to downtubes 40 by clamps 42, and the inner ends of the respective support bars 30c are secured to each other by means of couplings 44 and locknuts 44a, so that each bumper has the support of both upright frame sections To facilitate adjusting bar 30c into inner core 30a, turnbuckle coupling 44 can be horizontally enlarged and support bars 30c can thread into it (with opposite threading to allow tightening by turning either bars 30c or coupling 44).

The size and location of bumpers 30 are critical factors. Although automobile bumpers are not uniform either in dimensions or in distance from the ground (this distance is also a variable depending on the load carried by the vehicle and other factors), there are certain parameters or ranges that are fairly constant. Thus, for many years, passenger motor vehicles in the United States have been required by Federal Motor Vehicle Safety Standards to pass a swinging "pendulum test" when struck from a height of between 16 inches and 20 inches from the ground. In order to pass this test, passenger automobile manufacturers standardized the height of car bumpers, at least to the extent that "part of the bumper" would be 16–20 inches from the ground. Moreover, the vast majority of bumpers on pick-up trucks and suburban passenger motor vehicles in the United States also have bumpers that fall within these parameters. These vehicles, as well as the passenger automobiles, most often have bumpers that are wider than the required "4 inches"; typically, bumpers are 12–14 inches to 20–24 inches from the low to high point. This standardization tends to ensure that when two automobiles are in end-to-end collision, their bumpers contact one another, minimizing damage and injury from front, rear, and corner impacts.

This invention applies, for the first time, the principle of the standardized height cam-faced, energy absorbing bumper, to motorcycles. By concentrating the mass of the leg protecting motorcycle bumper 30 in one precise, strategic location, a very favorable strength-protection/weight ratio is achieved when compared to tube-type and leg covering leg protection designs. Other problems inherent in the tube-type and leg covering leg protection devices are also reduced by the motorcycle bumper 30; there is little or no compromise of freedom to dismount, the risk of hooking is reduced, the shock absorbency of the leg is replaced and can be improved upon by the absorbent outer shell, there is little or no loss of maneuverability, and the motorcycle continues to look and perform like a motorcycle, thereby increasing consumer acceptance and use of the motorcycle bumper 30 leg protection design. To achieve this result, inner core 30a (and 52 and 86) and inner core support bar 119 have an outboard vertical dimension with a central reference point 18" above the roadway surface. The section of bumper 30 above said reference point would extend upward at least 4" to preferably 10", since as this dimension increases, the risks of bumper mismatch and bumper override decreases. This dimension is limited by considerations of cost, motorcycle design, appearance, and weight. The lower section would extend downward at least 4" from said reference point, but preferably as far as possible, since as this dimension increases, the risks of bumper mismatch and bumper override decreases. This dimension is limited by considerations of cost, motorcycle design, appearance, weight, and ground clearance. Ground clearance would be limited by both normal driving and turning clearances. Since the minimum outboard (axial) distance bumper 30 extends outward from the motorcycle frame is equal to the sum of the axial dimensions of (a) inner core 30a, which must be equal to or greater than the distance from the frame to the outside surface of the rider's leg and foot when in normal riding position, and (b) the axial thickness of energy absorbing shell 30b, which is equal to at least that thickness which would absorb as much force as the lower leg of an average rider. The maximum (optimal) lower and outboard dimensions of bumper 30 beyond the above minimums would be those dimensions that would provide the optimal combination of vertical and horizontal dimensions without creating an undue risk of the lower, outboard portion of the bumper striking the ground during the type of turns for which the particular motorcycle was designed.

Depending upon the angle of impact, a single pair of bumpers 30 can reduce the risk of leg injury to both the driver and passenger during an accident. Protection of the passenger over a wider range of accident configurations can be increased by adding a rear bumper 30 to each side of the motorcycle. This rear bumper, like the front bumper above described, would be secured to the motorcycle frame by the same or other suitable means. The location of the rear bumper relative to the motorcycle would be forward of the passenger foot rest 28 although, if desired, it may be positioned behind the passenger footrest. In either case, the rear bumper is placed adjacent the passenger's leg when in normal riding position. The location of the rear bumper relative to the ground corresponds to the distance from the ground position of the front bumper.

The invention is not limited to a bumper having the configuration of a spherical segment. Another suitable configuration would be that of an ellipsoidal segment as illustrated by bumper 50 (FIG. 4) and inner core 52. It will be noted that the major axis of core 52 is vertical and its vertical length should correspond, approximately, to the vertical diameter of bumper core 30a. The width of bumper 50 at its minor axis (which is aligned, substantially, with the longitudinal axis of the motorcycle) is a matter of preference, with cost and weight being balanced with safety and performance.

The distance of bumper core 52 from the ground corresponds to the distance of bumper core 30a from the ground, that is, optimally, about 18 inches to the center of bumper core 52 on its major, vertical axis. If desired, only a single bumper 50 may be mounted on each side of the motorcycle, and it would be secured to the motorcycle frame as described with respect to bumper 30. This means that it would be secured to the front frame members 40. On the other hand, two bumpers 50 may be mounted on each side of the motorcycle, one in front for the protection mainly of the rider (driver), the second in the rear for the protection mainly of the passenger.

The construction of bumper 50 corresponds to that of bumper 30, that is, it comprises a strong non-collapsible shell 52 mounted on support bars 30c and a collapsible, energy absorbing cover 54 on said shell. The principal feature of bumper 50 that identifies it with bumper 30 is its cam faced configuration that tends to cam the motorcycle and an automobile apart in a bumper-to-bumper collision between them. Other cam-faced configurations may be used in this invention and they are included within the intended scope of the appended claims.

Turning now to another preferred form of the invention (FIGS. 9-11), it will be observed that two oppositely disposed bumpers 60 are supported on a single, horizontal, transverse support bar 62. Bumpers 60, like the bumpers of the other embodiments of the invention, comprise a strong, relatively non-collapsible inner shell 60a having a cam-faced configuration, and an energy-absorbing, impact cushioning cam-faced outer shell 60b.

Figure 9:
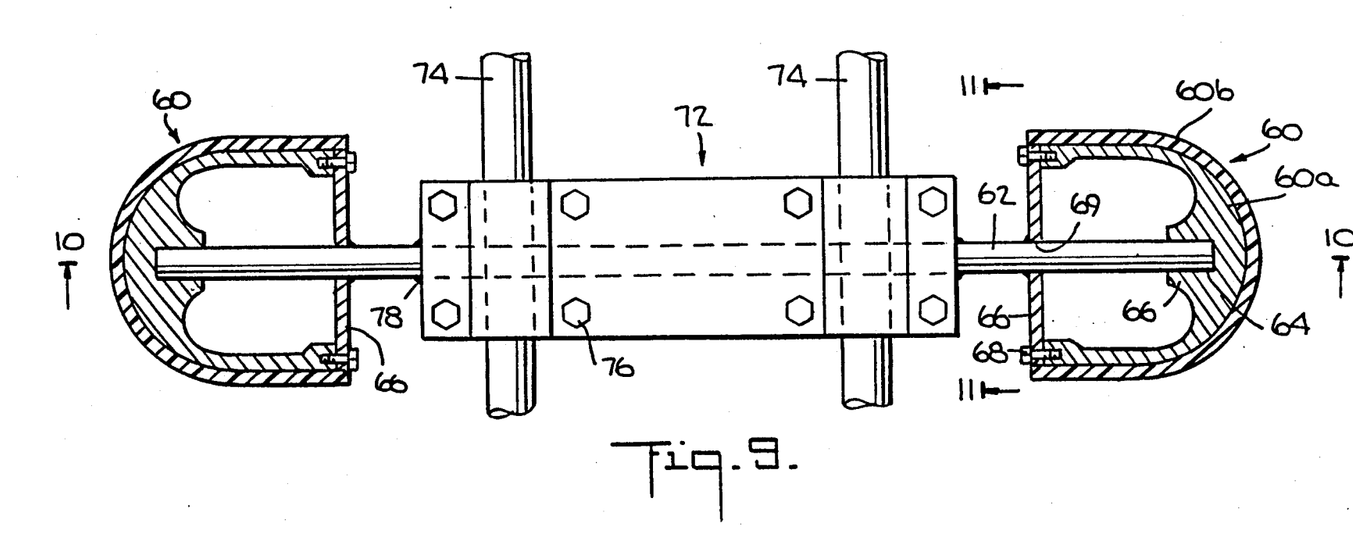
FIG. 9 is view, similar to that of FIG. 2, but showing a modified form of bumper support system.
Figure 10:
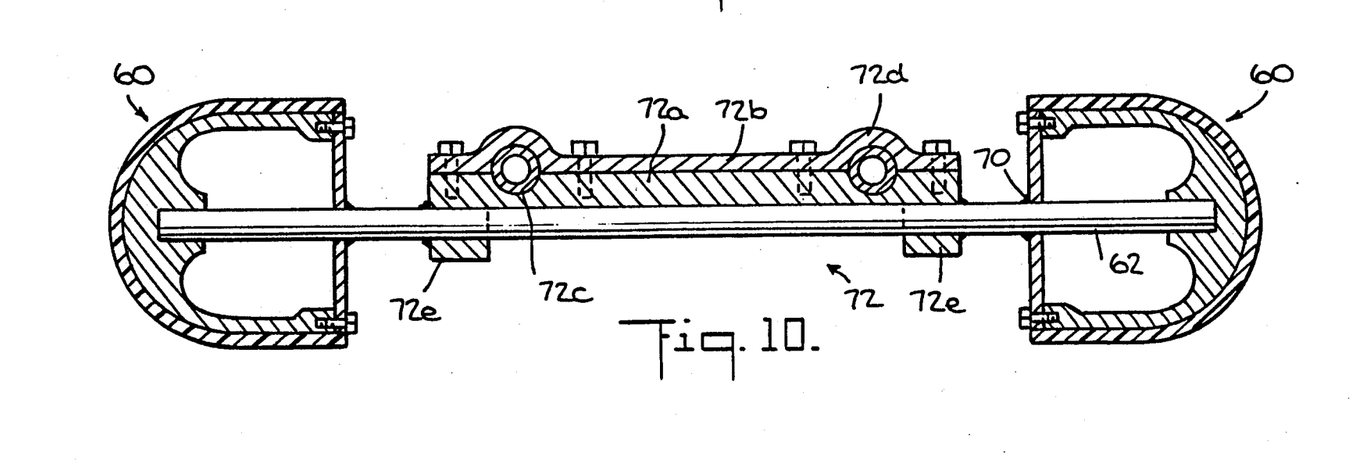
FIG. 10 is a horizontal section on the line 10—10 of FIG. 9.
Figure 11:
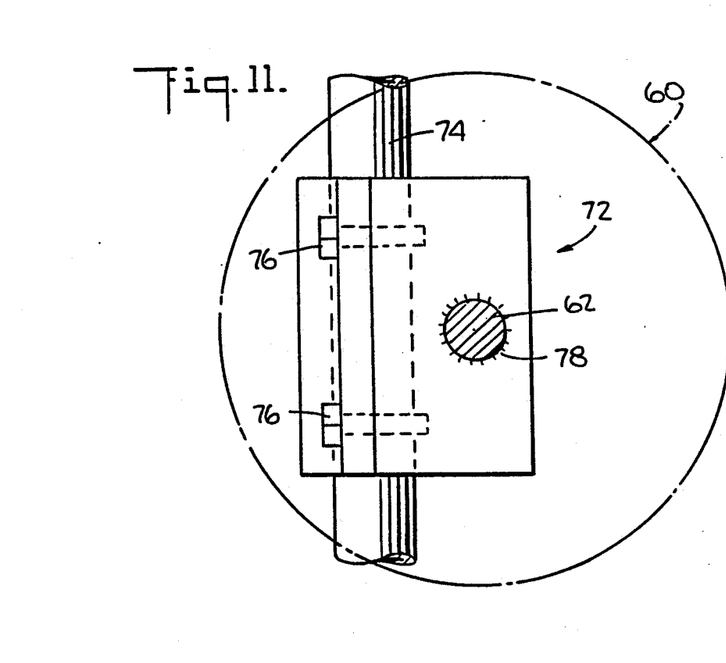
FIG. 11 is a vertical section on the line 11—11 of FIG. 9.

Support bar 62 is either solid or tubular and made of the same material as bar 30c. Preferably, but not necessarily, support bar 62 is cylindrical in shape and each end is seated within a cylindrical well 64 formed in centrally located embossment 66 formed in the inner shell 60a of one of the bumpers. The support bar 62 is secured to the inner shell of each of the bumpers by means of a disc 66. This disc is secured to the inner shell by means of bolts 68. Support bar 62 extends through a centrally located cylindrical hole 69 in the disc and it is secured to the disc by means of welding 70. The result is a strong composite unit combining the two bumpers and the support bar.

A bracket 72 is provided to removably secure the support bar 62, that crosses in front of and is secured to the front frame members 74 of a motorcycle. As shown in FIG. 10, this bracket consists of two parts, a base plate 72a and a clamp plate 72b. The base plate is provided with the two vertical grooves 72c complementing and accommodating 180 degrees of motorcycle frame members 74. The clamp plate 72b is provided with two curved bends 72d which complement and accommodate the remaining 180 degrees of motorcycle frame members 74. Bolts 76 secure the clamp plate 72b to the base plate 72a and thereby clamp bracket 72 to the motorcycle frame members 74.

Support bar 62 extends through transverse holes in end parts 72e of base plate 72a and welds 78 secure said support bar to said end parts. The result is a strong structural support on the motorcycle frame members 74 for the bumpers 60. The bumpers are not adjustable laterally of the motorcycle. However, to the extent that the front frame member 74 of the motorcycle are parallel to each other, bracket 72 is vertically adjustable relative to the ground and this means that the bumpers are also vertically adjustable relative to the ground.

Figures 12, 13, 14:
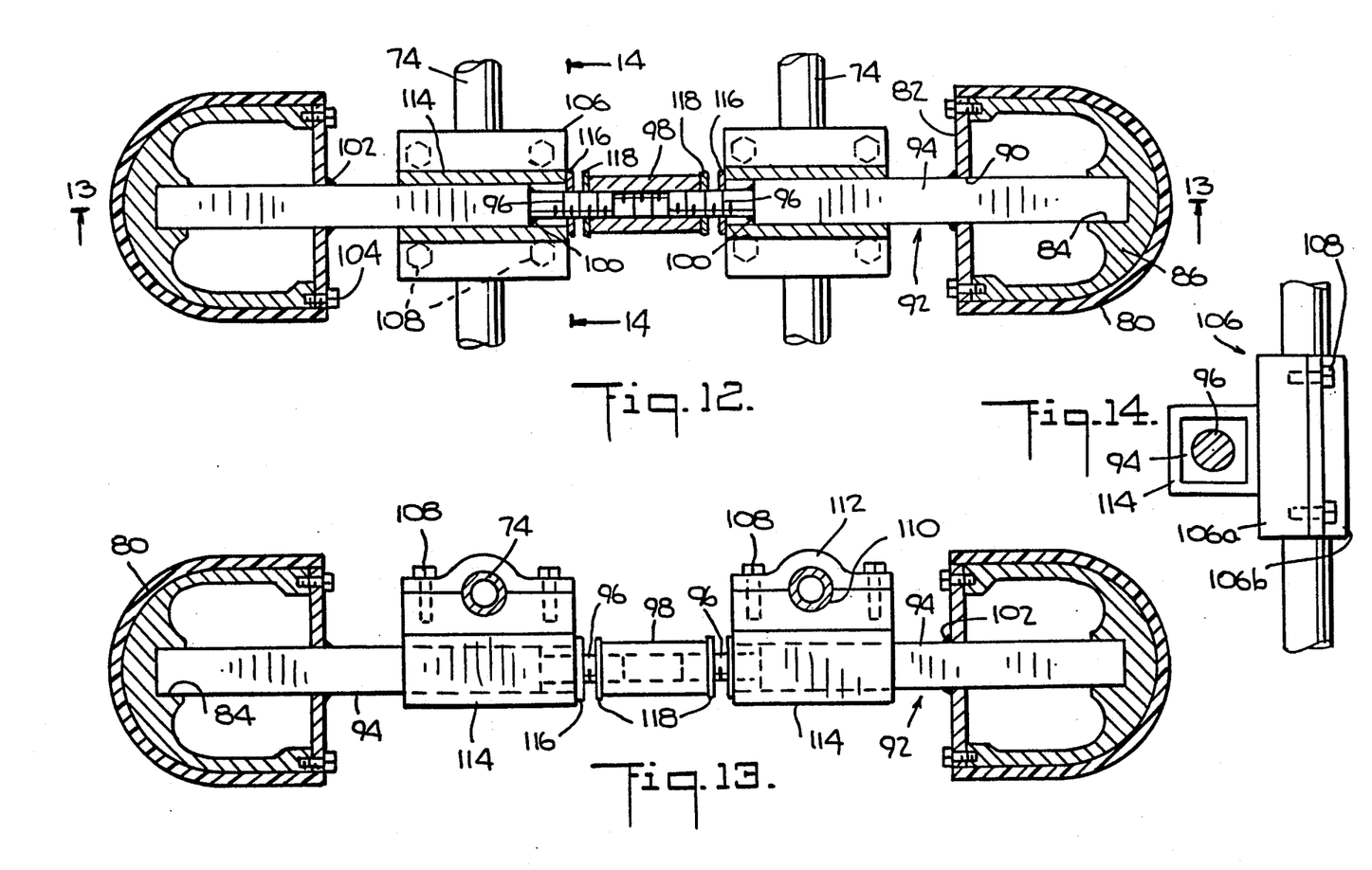
FIG. 12 is a view, similar to that of FIG. 9, but showing another modified form of bumper support system.
FIG. 13 is a vertical section on the line 13—13 of FIG. 12.
FIG. 14 is a vertical section on the line 14—14 of FIG. 12.

Turning now to the embodiment of the invention shown in FIGS. 12-14, it will be understood that bumpers 80 and discs 82 correspond to bumpers 60 and discs 66 except that the well 84 in enlargement 86 of inner shell 88, and the center hold 90 of disc 82 are square rather than cylindrical.

Support bar 92 of the embodiment of FIGS. 12-14 is a composite of five axially aligned parts: two square tubes 94, two threaded cylindrical rods 96, and internally threaded turnbuckle 98 that serves as a coupling between the inner ends of the two threaded rods. The two threaded rods are oppositely threaded to complement and engage the ends of the turnbuckle.

As shown in FIGS. 12 and 13, the outer ends of the two threaded rods 96 project into the inner ends of the two square tubes 94 and welds 100 secure the threaded rods to the square tubes. The outer ends of the square tubes extend through square hole 90 in discs 82 and into square well 84 in shells 88. Welds 102 secure the square tubes 94 to discs 82 and bolts 104 secure said discs to shells 88. By rotating turnbuckle 98 relative to threaded rods 96 and square tubes 94, support bar 92 can be lengthened or shortened.

It will be observed that support bar 92 passes in front of and is supported on the front frame members 74 by means of two separate brackets 106. Each bracket 106 comprises a base plate 106a and a clamp plate 106b secured to each other by means of bolts 108. A 180 degree channel 110 is formed in the base plate and a complementary 180 degree bend 112 is formed in the clamp plate, the channel and the bend combining to form a cylindrical receptacle for one of the motorcycle frame members 74. The two brackets can thereby be secured to the front frame members of the motorcycle.

A square sleeve 114 fixed to or integral with each base plate 106a receives the corresponding square tube 94 of the adjacent bracket 106 in a sliding fit. This secures the square tube to the bracket 106 except as the square tube may be moved longitudinally by rotating turnbuckle 98. Locknuts 116 on the threaded rods 96 and operating against the ends of sleeves 114 of the two brackets on the motorcycle frame members resist longitudinal movement of the support bar 92 laterally of the motorcycle. Additional locknuts 118 on the threaded rods, operating against the turnbuckle resist rotation caused by vibration.

In this mounting system for the bumpers, the entire mounting and support structure (brackets 106 and support bar 92) may be adjusted vertically relative to the ground by loosening bolts 108 and moving brackets 106 vertically on motorcycle frame members 74. At the proper height for the bumpers, bolts 108 are tightened to clamp the brackets 106 to the motorcycle frame members 74. This adjusts the bumpers vertically relative to the ground.

It is also possible in this mounting system to adjust the bumpers horizontally, that is, laterally relative to the motorcycle, by loosening locknuts 118 and 116 and rotating turnbuckle 98 in either direction. When the bumpers are in the desired position laterally of the motorcycle, these locknuts are tightened.

Figure 7:
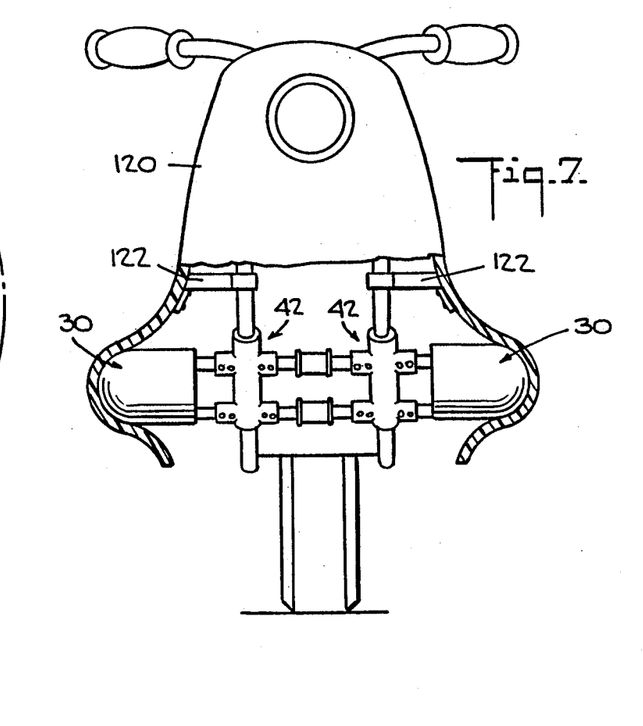
FIG. 7 is a front view, partly in vertical section, showing a motorcycle embodying the bumper system of FIG. 2, said motorcycle being provided with a fairing that encloses the bumper system.
Figure 8:
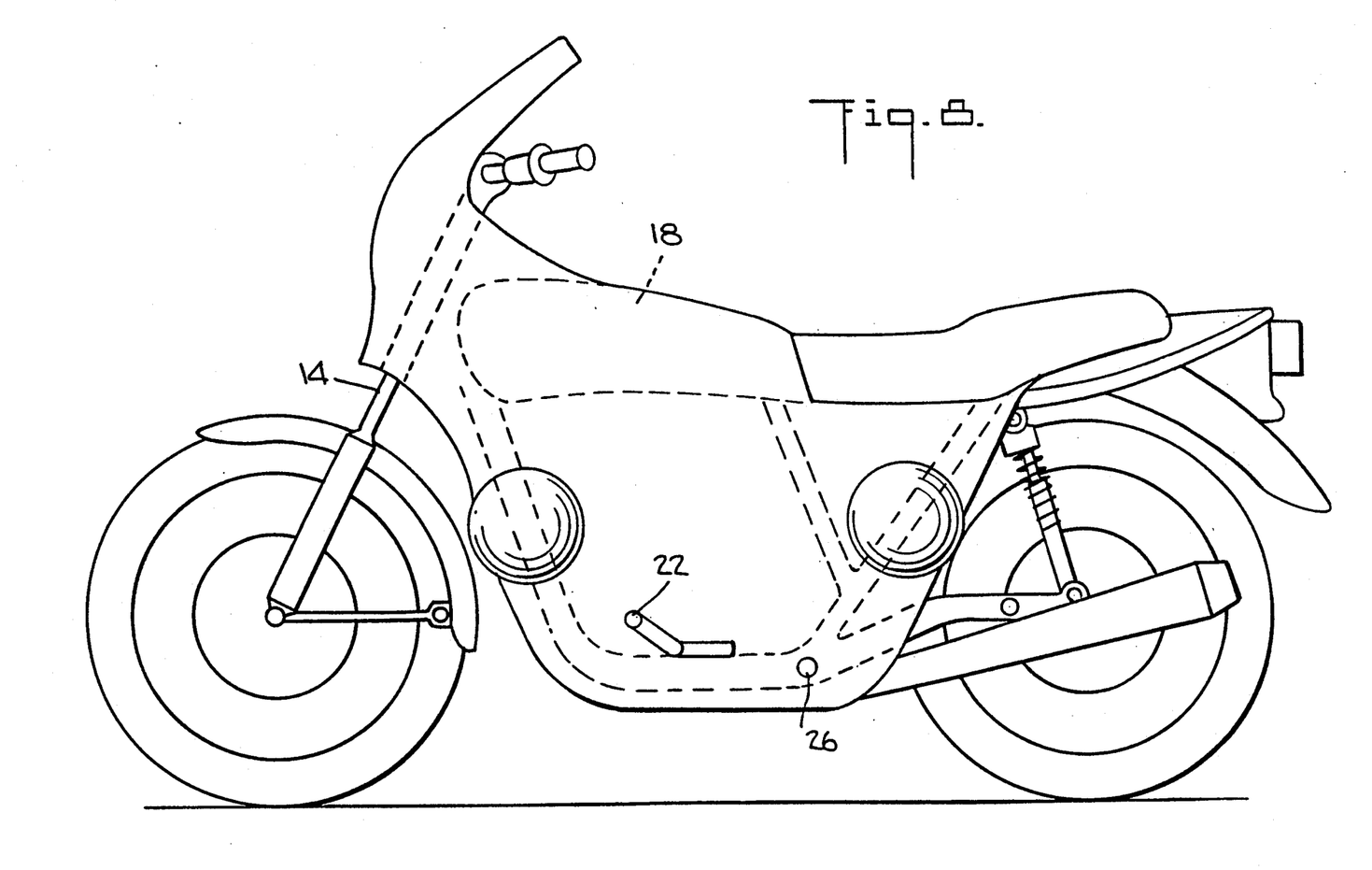
FIG. 8 is a side view of the motorcycle shown in FIG. 7.

As shown in FIG. 7, the present invention may be used in conjunction with exterior aerodynamic side covers 120 mounted in conventional manner and by conventional means, e.g., brackets 122, on the motorcycle frame. Alternatively, they may be mounted on the support bars, all by conventional means. Side covers 120 cover the bumpers so that they are not readily visible in side view. If desired, however, the side covers may be provided with openings through which the bumpers extend. This is a matter of design and preference.

The invention is not limited to mounting the bumper support bars directly on the motorcycle frame. They may also be mounted indirectly on the motorcycle frame by being secured to the motorcycle engine, transmission, crankcase or any other component of the motorcycle that is attached to the frame in such a manner and has sufficient strength and mass that it will not fail (pivot or dislodge or otherwise break or detach from the frame) during a protectable impact.

Figures 15, 16, 17, 21:
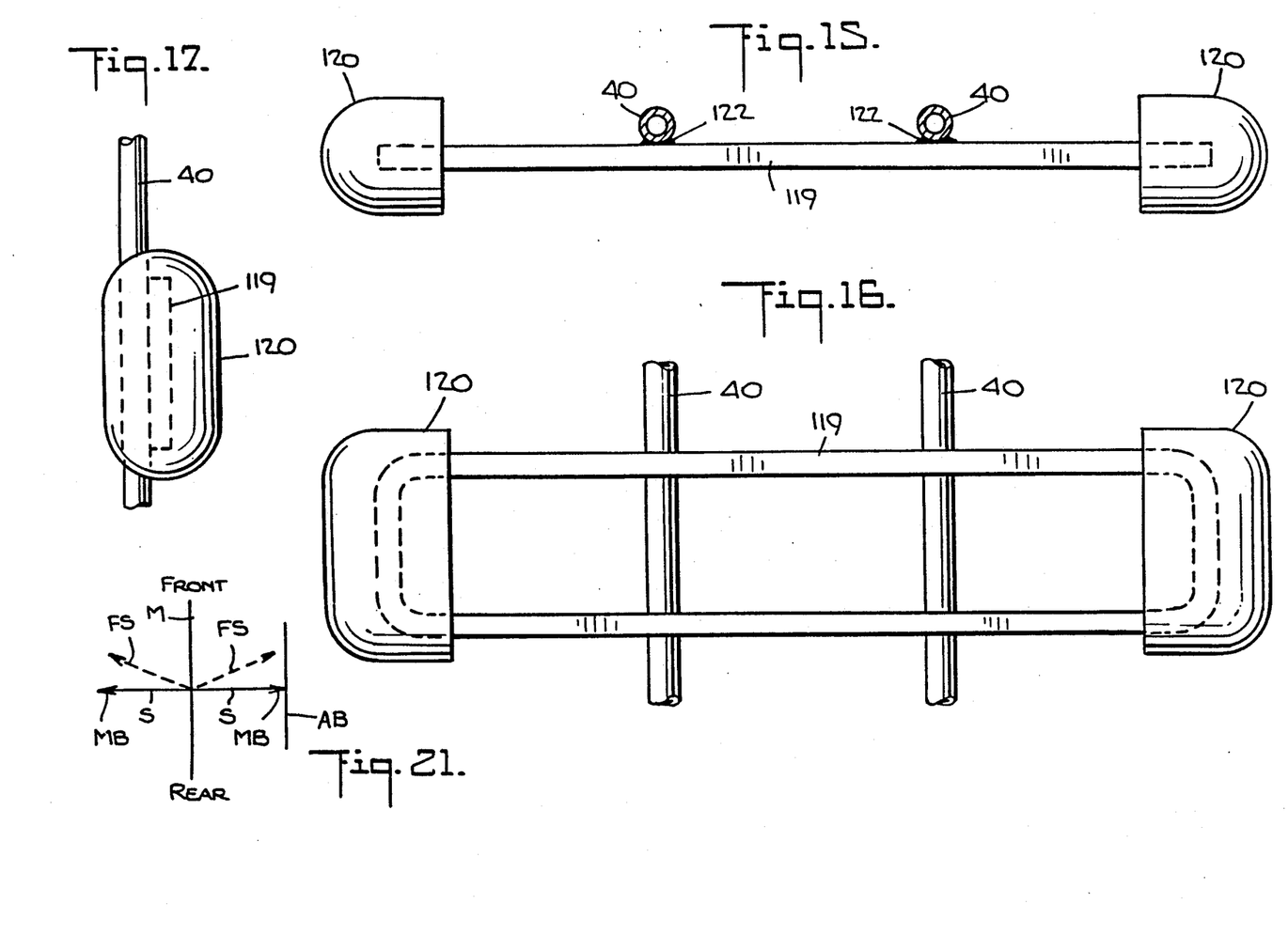
FIG. 15 is a top view,, partly in horizontal section, showing another embodiment of the invention.
FIG. 16 is a front view of the embodiment of FIG. 15.
FIG. 17 is a side view of the embodiment of FIG. 15.
FIG. 21 is schematic view showing the orientation of the bumper support bars relative to the longitudinal axis of the motorcycle on which they are mounted and an automobile bumper in a hypothetical automobile-motorcycle broadside collision.

FIGS. 15 through 17 represent a method of construction of the motorcycle bumper system which is intended to further reduce the weight and cost of the motorcycle bumper system previously described. In this configuration, inner core 30a (and 52 and 86) and support tubes 30c are eliminated, and one continuous bar or tube 119, constructed of steel, aluminum, carbon fiber, titanium, chromium-molybdenum, an alloy of these materials, or an equally strong material, serves as both a support bar and a rigid base to which bumper 120 is attached. Bar 119 is attached to downtubes 40 either by using a pair of brackets 42 or 72 or, for original manufacture, it may also be attached by welding, e.g., welds 122, to downtubes 40, and be a permanent, integral component of the motorcycle.

Bumper 120 may have the same construction as the other bumpers above described, that is, a strong inner core having a cam-faced surface configuration and an outer shell or coating of energy absorbing material. Alternatively, it may comprise a shell constructed of rubber, synthetic rubber, polyurethane, polyethylene or similar material that can provide the necessary energy absorption and forward and outboard cam faced configuration, and, at the same time, withstand the elements of sunlight, heat, rain and minor to moderate impacts without significant deformation, degradation and loss of energy absorbing capacity over the expected useful lifetime of the motorcycle. This shell can be molded to bar 119 or attached by any conventional means that will withstand separation from bar 119 during a protectable impact. Cost and weight are minimized by this configuration because the shell is only as wide as necessary to provide the required energy absorbing capability on its forward and outward facing surfaces, but on its top, bottom and rear surfaces, it is only as thick as necessary as molding or other suitable attaching methods require, since this will provide energy absorption in the overwhelming percentage of broadside or sideswipe accidents, reduce the risk of injury to the rider from trauma to the leg by striking bar 119a during a collision, and reduce the amount (and cost) of the energy absorbing material as compared to having a shell of uniform thickness on all surfaces. Cost will be further reduced by eliminating the cost of fabricating inner core 30a (and 52 and 86) and 30c, as well as the expense of connecting and securing them to each other will also be eliminated.

The cost of manufacture of the motorcycle bumper system 30a (and 52 and 86) outer shell 30b (and 54) system shown in FIGS. 2, 3, 4 and 5 by thinning the inner core 30a (and 52 and 86) and outer shell 30b (and 54) sections that are unlikely to be subjected to impact and thickening them on the surfaces most likely to be impacted. The upper, lower and rear surfaces of 30a (and 52 and 86) can be thinned to the minimum thickness that will allow the connection of 30a (and 52 and 86) and 30c to withstand, to the extent feasible, a protectable impact without failure. The outboard and front surfaces can be thickened, if desired, to increase the overall strength of 30a (and 52 and 86). Outer shell 30b (and 54) can be thinned on its upper, lower and rear surfaces to the minimum thickness required for a secure bond. By using this configuration, the wider cam-faced impact resistant profile of the motorcycle bumper system (as compared to support/core bar 119) is retained, but cost is still reduced.

Figure 18:
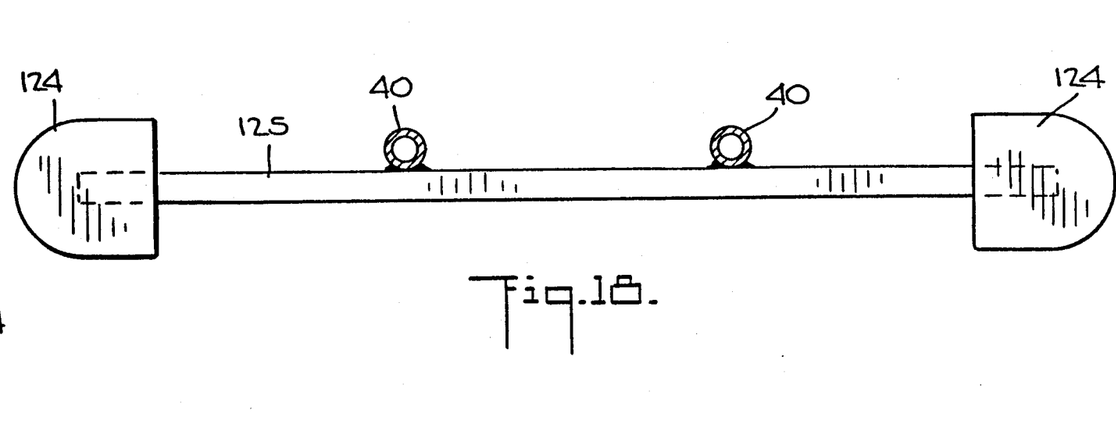
FIG. 18 is a top view, similar to that of FIG. 15, showing a modified embodiment of the invention wherein the bumpers are of semi-cylindrical configuration.
Figure 19:
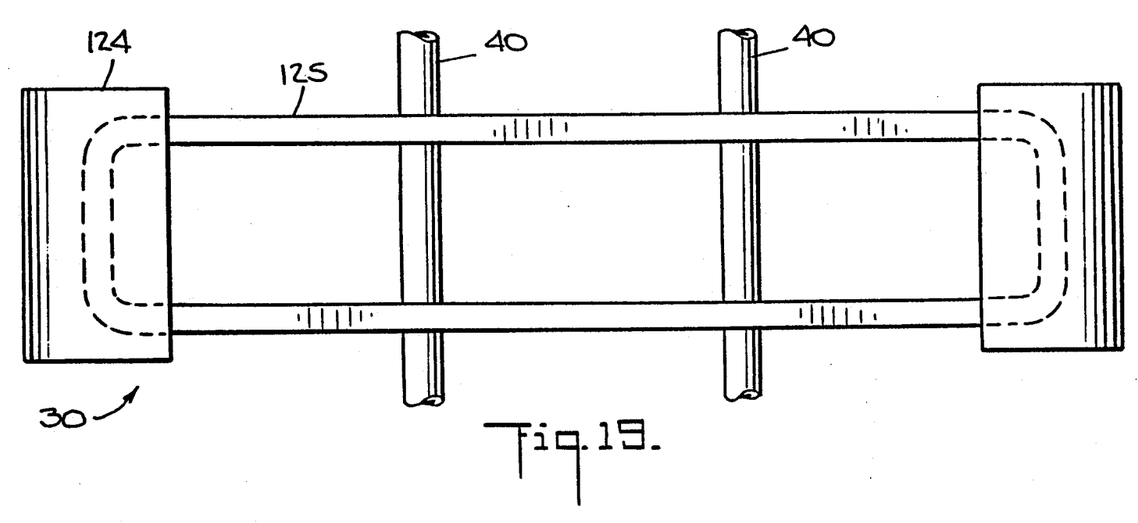
FIG. 19 is a front view of the embodiment of FIG. 18.
Figure 20:
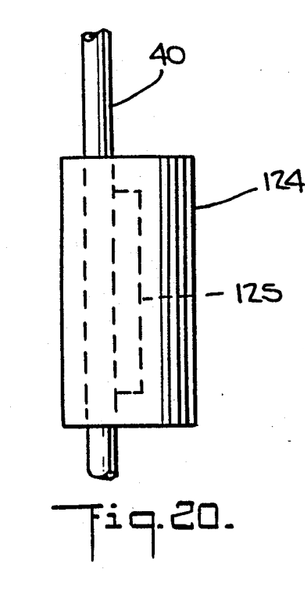
FIG. 20 is a side view of the embodiment of FIG. 18.

FIGS. 18, 19 and 20 are top, front and side views of another preferred version of the motorcycle bumper system, showing bumper 124 and support bar 125. Although they depict a two-piece configuration (similar to bar 119/bumper 120 shown in FIGS. 15, 16, and 17), the design configuration shown in FIGS. 18, 19 and 20 can also be applied to the designs utilizing three separate components, i.e., inner core 30a (and 52 and 86), outer shell 30b (and 54) and support bar 30c (and 62). The feature that distinguishes the bumper 124/bar 125 design is that the front, side and rear impact surfaces of bumper 30 (whether using the two or three section configuration) define a semi-cylindrical configuration having a substantially vertical longitudinal axis. This configuration provides a cam-faced surface that tends to deflect horizontally only, and thereby tends to prevent overriding or underriding by a colliding automobile bumper. If the three section configuration (not shown) were used, the front, side and rear surfaces of both the inner solid core and the outer energy absorbent shell would be semi-cylindrical.

It will now be observed, in each form of the invention herein described and illustrated in the drawing, that the bumper support defines a straight-line structure secured to the motorcycle structure and oriented to point squarely at the colliding automobile bumper, so that the motorcycle bumper, can meet the impact of the automobile bumper head-on under many accident configurations.

This is illustrated in schematic FIG. 21 wherein line M represents a vertical plane coinciding with the longitudinal axis of a motorcycle, lines S represent the oppositely extending bumper supports (all embodiments herein described and claimed) on the opposite sides of the motorcycle, arrow heads MB at the ends of lines S represent the motorcycle bumpers (all embodiments herein described and claimed) supported by said bumper supports, and line AB depicts a vertical plane representing the face of an automobile bumper in collision with the motorcycle. Lines S extend in a horizontal plane; they are substantially perpendicular to vertical plane M and vertical plane AB. This schematic represents an automobile striking a motorcycle broadside.

It is, of course, realized that not all automobile-motorcycle broadside collisions impact precisely at a 90 degree angle, but it is believed that the orientation of the bumper supports relative to plane M, as indicated by lines S in the schematic drawing, is able to protect against many accident configurations. Should it be determined that additional support is needed, use may be made of additional bumper supports FS (all bumper support embodiments herein described and claimed, supporting all bumper embodiments herein described and claimed). The principle of the invention would remain unchanged since the bumper supports would retain straight-line relationship between the motorcycle structure to which they are secured and the impacting face of an automobile bumper.

I claim:

1. A motorcycle bumper system comprising:
   a. at least one straight-line bumper support secured to each side of a motorcycle and extending laterally therefrom,
   b. a motorcycle bumper secured to said bumper support for primary protection against the sideward impact of an automobile bumper in an automobile-motorcycle collision,
   c. said bumper support being oriented to point squarely at said automobile bumper, and
   d. thereby supporting the motorcycle bumper in position to meet the impact of the automobile bumper head-on,
   e. the motorcycle bumper being provided with an energy-absorbing, collision impact cushioning section, and
   f. a relatively non-collapsible support section underlying said energy-absorbing, collision impact cushioning section,
   g. said non-collapsible support section projecting laterally from the motorcycle at least to the same extent as the rider's leg projects therefrom in normal riding position.

2. A motorcycle bumper system in accordance with claim 1, wherein:
   a. the motorcycle bumper has a vertical dimension corresponding to at least the minimum vertical dimension of convention automobile bumpers, and
   b. said motorcycle bumper is positioned by said bumper support at a height from the ground corresponding, substantially, to the height from the ground of conventional automobile bumpers.

3. A motorcycle bumper system in accordance with claim 2, wherein:
   said bumper support supports the motorcycle bumper adjacent and forward of the rider's leg when in normal riding position.

4. A motorcycle bumper system in accordance with claim 1, wherein:
   the motorcycle bumper has a non-confining configuration adapted to leave the motorcycle rider's leg free for dismounting.

5. A motorcycle bumper system comprising:
   a. at least one straight-line bumper support secured to each side of a motorcycle and extending laterally therefrom,
   b. a motorcycle bumper secured to said bumper support for primary protection against the sideward impact of an automobile bumper in an automobile-motorcycle collision,
   c. said bumper support being oriented to point squarely at said automobile bumper, and
   d. thereby supporting the motorcycle bumper in position to meet the impact of the automobile bumper head-on,
   e. the cam-faced configuration of the motorcycle bumper defining a collision impact section having the general configuration of a spherical segment.

6. A motorcycle bumper system comprising:
   a. at least one straight-line support secured to each side of a motorcycle and extending laterally therefrom,
   b. a motorcycle bumper secured to said bumper support for primary protection against the sideward impact of an automobile bumper in an automobile-motorcycle collision,
   c. said bumper support being oriented to point squarely at said automobile bumper, and
   d. thereby supporting the motorcycle bumper in position to meet the impact of the automobile bumper head-on,
   e. the cam-faced configuration of the motorcycle bumper defining a collision impact section having the general configuration of an ellipsoid segment,
   f. said collision impact section being positioned with its longitudinal axis extending substantially vertically.

7. A motorcycle bumper system comprising:
   a. at least one straight-line bumper support secured to each side of a motorcycle and extending laterally therefrom,
   b. a motorcycle bumper secured to said bumper support for primary protection against the sideward impact of an automobile bumper in an automobile-motorcycle collision,
   c. said bumper support being oriented to point squarely at said automobile bumper, and
   d. thereby supporting the motorcycle bumper in position to meet the impact of the automobile bumper head-on,
   e. the cam-faced configuration of the motorcycle bumper defining a collision impact section having the general configuration of a semi-cylindrical segment,
   f. said collision impact section being positioned with its longitudinal axis extending substantially vertically.

8. A motorcycle bumper system in accordance with claim 1, wherein:
   a. the motorcycle is provided with a frame, including front down tubes,
   b. said bumper support being secured to said frame.

9. A motorcycle bumper system in accordance with claim 8, wherein:
   a. the bumper support comprises at least one horizontal bar extending transversely of the motorcycle,
   b. said horizontal bar being secured to said motorcycle frame and supporting two motorcycle bumpers, one at each end.

10. A motorcycle bumper system in accordance with claim 9, wherein:
    a. the horizontal bar is adjustably secured to the front downtubes of the motorcycle frame,
    b. whereby the horizontal bar is vertically adjustable relative to the motorcycle frame and the motorcycle bumpers are thereby vertically adjustable relative to the ground.

11. A motorcycle bumper system comprising:
    a. at least one straight-line bumper support secured to each side of a motorcycle and extending laterally therefrom,
    b. a motorcycle bumper secured to said bumper support for primary protection against the sideward impact of an automobile bumper in an automobile-motorcycle collision, c. said bumper support being oriented to point squarely at said automobile bumper, and
d. thereby supporting the motorcycle bumper in position to meet the impact of the automobile bumper head-on,
e. the motorcycle being provided with a frame, including front down tubes,
f. said bumper support being secured to said frame,
g. the bumper support supporting at least one horizontal bar extending transversely of the motorcycle,
h. said horizontal bar being secured to said motorcycle frame and supporting two motorcycle bumpers, one at each end,
i. the horizontal bar comprising two axially aligned, oppositely threaded sections and a turnbuckle between them,
j. said turnbuckle being in screw-threaded engagement with said oppositely threaded sections to adjust them and the bumpers laterally of the motorcycle.

12. A motorcycle bumper system in accordance with claim 1, wherein:
a. two said bumper supports are secured to each side of a motorcycle, one motorcycle bumper on each bumper support,
b. one of said bumper supports being located adjacent the riding location of the corresponding leg of a motorcycle passenger.

13. A motorcycle bumper system in accordance with claim 1, wherein the motorcycle bumper is enclosed within an exterior aerodynamic side cover mounted on the motorcycle.

14. A motorcycle bumper system comprising:
a. at least one straight-line bumper support secured to each side of a motorcycle and extending laterally therefrom,
b. a motorcycle bumper secured to said bumper support for primary protection against the sideward impact of an automobile bumper in an automobile-motorcycle collision,
c. said bumper support being oriented to point squarely at said automobile bumper, and
d. thereby supporting the motorcycle bumper in position to meet the impact of the automobile bumper head-on,
e. the motorcycle bumper being provided with an energy-absorbing, collision impact cushioning section, and
f. a relatively non-collapsible support section underlying said energy-absorbing, collision impact cushioning section,
g. said non-collapsible support section projecting laterally from the motorcycle at least to the same extent as the rider's leg projects therefrom in normal riding position,
h. the energy-absorbing, collision impact cushioning section covering all surfaces of the underlying non-collapsible support section that could be impacted by the motorcycle rider's leg in a collision.

15. A motorcycle bumper system comprising:
a. at least one straight-line bumper support secured to each side of a motorcycle and extending laterally therefrom,
b. a motorcycle bumper secured to said bumper support for primary protection against the sideward impact of an automobile bumper in an automobile-motorcycle collision,
c. said bumper support being oriented to point squarely at said automobile bumper, and
d. thereby supporting the motorcycle bumper in position to meet the impact of the automobile bumper head-on,
e. the motorcycle bumper being provided with an energy-absorbing, collision impact cushioning section, and
f. a relatively non-collapsible support section underlying said energy-absorbing, collision impact cushioning section,
g. said non-collapsible support section projecting laterally from the motorcycle at least to the same extent as the rider's leg projects therefrom in normal riding position,
h. the energy-absorbing, collision impact cushioning section having an energy-absorbing capability at least approximately that of the lower leg of a motorcycle rider.

16. A motorcycle bumper system comprising:
a. at least one straight-line bumper support secured to each side of a motorcycle and extending laterally therefrom,
b. a motorcycle bumper secured to said bumper support for primary protection against the sideward impact of an automobile bumper in an automobile-motorcycle collision.
c. said bumper support being oriented to point squarely at said automobile bumper, and
d. thereby supporting the motorcycle bumper in position to meet the impact of the automobile bumper head-on,
e. the motorcycle bumper being provided with an energy-absorbing, collision impact cushioning section, and
f. a relatively non-collapsible support section underlying said energy-absorbing, collision impact cushioning section,
g. said non-collapsible support section projecting laterally from the motorcycle at least to the same extent as the rider's leg projects therefrom in normal riding position,
h. the straight-line bumper supports being adjustable laterally of the motorcycle to adjust the positions of the bumpers laterally of the motorcycle,
i. said straight-line bumper supports being also adjustable vertically to adjust the positions of the bumpers relative to the ground.

17. A motorcycle bumper system comprising:
a. at least one straight-line bumper support secured to each side of a motorcycle and extending laterally therefrom,
b. a motorcycle bumper secured to said bumper support for primary protection against the sideward impact of an automobile bumper in an automobile-motorcycle collision,
c. said bumper support being oriented to point squarely at said automobile bumper, and
d. thereby supporting the motorcycle bumper in position to meet the impact of the automobile bumper head-on,
e. the motorcycle bumper being provided with an energy-absorbing, collision impact cushioning section, and
f. a relatively non-collapsible support section underlying said energy-absorbing, collision impact cushioning section, g. said non-collapsible support section projecting laterally from the motorcycle at least to the same extent as the rider's leg projects therefrom in normal riding position,
h. the straight-line bumper supports being adjustable laterally of the motorcycle to adjust the positions of the bumpers laterally of the motorcycle,
i. said straight-line bumper supports being also adjustable vertically to adjust the positions of the bumpers relative to the ground, and
j. the motorcycle bumpers having a cam-faced collision impact section with the general configuration of an ellipsoidal segment,
k. said collision impact section being positioned with its longitudinal axis extending substantially vertically.

18. A motorcycle bumper system comprising:
a. at least one straight-line bumper support secured to each side of a motorcycle and extending laterally therefrom,
b. a motorcycle bumper secured to said bumper support for primary protection against the sideward impact of an automobile bumper in an automobile-motorcycle collision,
c. said bumper support being oriented to point squarely at said automobile bumper, and
d. thereby supporting the motorcycle bumper in position to meet the impact of the automobile bumper head-on,
e. the motorcycle bumper being provided with an energy-absorbing, collision impact cushioning section, and
f. a relatively non-collapsible support section underlying said energy-absorbing, collision impact cushioning section,
g. said non-collapsible support section projecting laterally from the motorcycle at least to the same extent as the rider's leg projects therefrom in normal riding position,
h. the straight-line bumper supports being adjustable laterally of the motorcycle to adjust the positions of the bumpers laterally of the motorcycle,
i. said straight-line bumper supports being also adjustable vertically to adjust the positions of the bumpers relative to the ground, and
j. the motorcycle bumpers having a cam-faced collision impact section with the general configuration of a semi-cylinder,
k. said collision impact section being positioned with its longitudinal axis extending substantially vertically.

* * * * *